Figure 1:
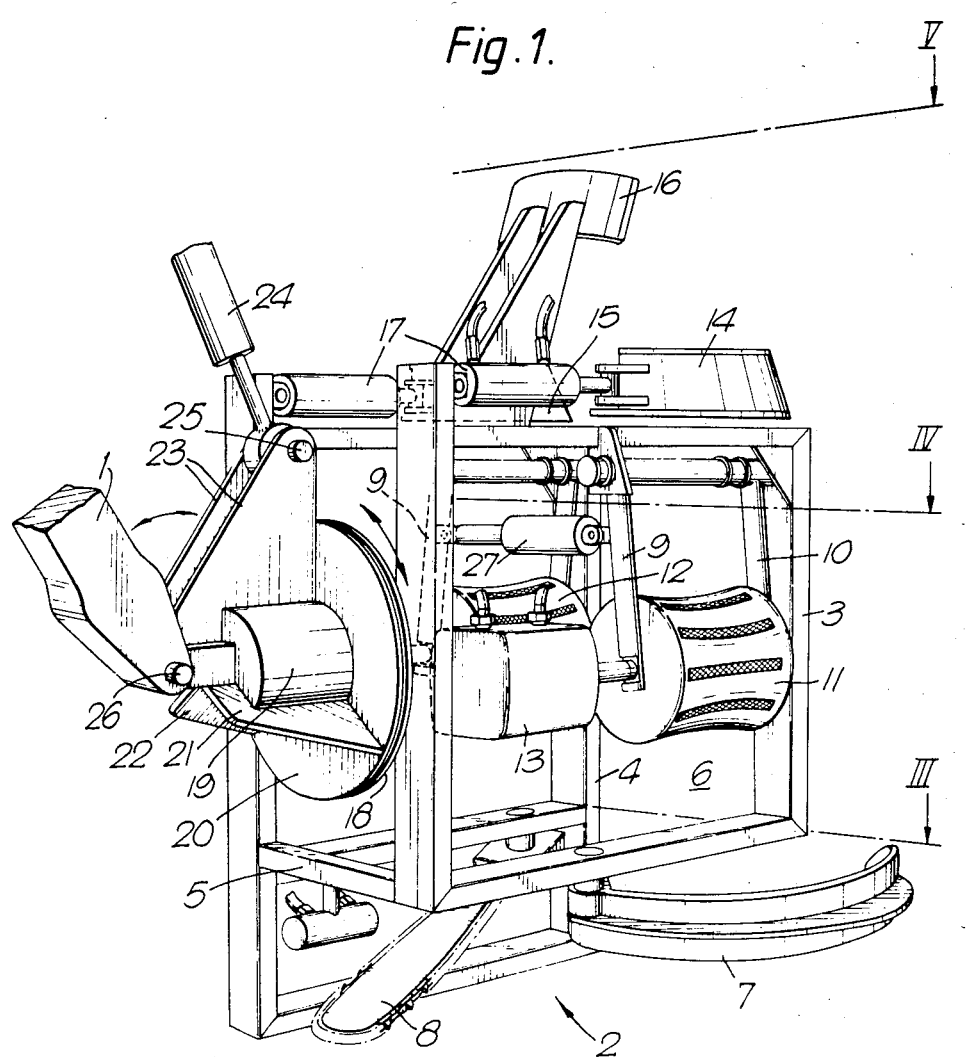

United States Patent [19]

Kuusilinna

[11] Patent Number: 4,552,191
[45] Date of Patent: Nov. 12, 1985

[54] TREE HARVESTING DEVICE

[76] Inventor: Olavi Kuusilinna, SF-34510 Luode, Finland

[21] Appl. No.: 586,458

[22] Filed: Mar. 5, 1984

[51] Int. Cl.⁴ .............................................. A01G 23/08
[52] U.S. Cl. .................... 144/3 D; 144/2 Z; 144/34 R; 144/336; 144/343
[58] Field of Search ..................... 144/2 Z, 3 D, 34 R, 144/335, 336, 338, 343

[56] References Cited

U.S. PATENT DOCUMENTS

| | | | |
|---|---|---|---|
| 3,542,099 | 11/1970 | Gibson | 144/3 D |
| 3,797,539 | 3/1974 | Moser et al. | 144/3 D |
| 3,797,541 | 3/1974 | Kurelek et al. | 144/3 D |
| 3,981,336 | 9/1976 | Levesque | 144/3 D |
| 4,050,488 | 9/1977 | Albright | 144/3 D |
| 4,116,249 | 9/1978 | Hogberg et al. | |
| 4,313,479 | 2/1982 | Coughran, Jr. | |
| 4,412,569 | 11/1983 | Barnett et al. | 144/3 D |

FOREIGN PATENT DOCUMENTS 52263  8/1977  Finland .

Primary Examiner—W. D. Bray
Attorney, Agent, or Firm—Pollock, Vande Sande & Priddy

[57] ABSTRACT

Tree harvesting device is connected to a mobile vehicle by means of a jib (1) and comprises means for cutting, felling and debranching a tree. The device (2) has a general U-shaped frame comprising two side parts (3, 4), rear part (5) and an open front side (6). The cutting means (7, 8), the conveying means (11, 12) and debranching means (14, 15) being attached to the side parts (3, 4). The felling frame (19–23) is attached to the rear part (5) of a turnable means (28) in order to turn the device (2) in the transversal plane with respect to the vertical plane in the longitudinal direction of the jib (1). The felling frame (19–23) being connected to the jib (1) turnable in the vertical plane in the longitudinal direction of the jib (1).

7 Claims, 6 Drawing Figures

TREE HARVESTING DEVICE

This invention relates to tree harvesting device.

More particularly this invention relates to device, which can advantageously be used in connection with mobile vehicle such as tractor so that the total weight and other dimensions of the vehicle and the device are suitable for a special purpose in the field of harvesting namely cleaning. The cleaning in this sense means that a part of the trees in a forest, that has reached a certain growth (the volume of the tree being 100–200 dm$^3$) and age for example thirty years in the nordic areas, are harvested in order to improve the output of the forest. This means that a certain percentage of the trees namely those which have the lowest growth are removed. The problem however is the fact that this ought to be done without damaging the remaining trees, in order to achieve the basic purpose, that is, to allow the remaining trees to grow without damages and without rivals.

These requirements cannot be satisfied by means of the conventional harvesting apparatuses. Firstly because most of them are constructed for clearance harvesting, whereat all the trees in a certain area are harvested. Thus their construction is unsuitable for this kind of special purpose. Their total weight is too high. This means that the surface pressure against the ground can damage the roots of the remaining trees. Secondly they are too large in size to allow them to operate adequately between the remaining trees. Thirdly the construction of these apparatuses is such that after cutting the tree there is a limited number of possible directions to fell the tree. This is very unadvantageous, because the felling and debranching ought to be done between the remaining trees.

Thus the purpose of this invention is to present a harvesting device which can be used in connection with lightweight mobile vehicle such as tractor, having hydraulic operational equipments for operating the device. The total weight can thus be limited in order to prevent the roots from damaging. The dimensions of such a vehicle together with the same of the device make it possible to work between the remaining trees without damaging them. The construction of the harvesting device allows various possible directions to fell and to debranch the tree between the remaining ones.

Thus the purpose of the invention is broader sense is to rise the state of art as far as the economy of the forestry is concerned by means of a device which can do the cleaning harvesting which at the moment most widely is done manually.

In order to achieve these purposes the harvesting device in accordance with the invention is mainly characterized in that the device has a general U-shaped frame comprising two side parts, rear part and an open front side, the cutting means, the conveying means and debranching means being attached to the side parts, the felling frame being attached to the rear part by means of a turnable means, in order to turn the device in the transversal plane with respect to the vertical plane in the longitudinal direction of the jib and the felling frame being connected to the jib turnable in the vertical plane in the longitudinal direction of the jib.

The definitions in the claims and description are based on the cutting position of the device, whereat the front side of the device is parallel to the longitudinal direction of the tree before cutting the same.

Figure 2:
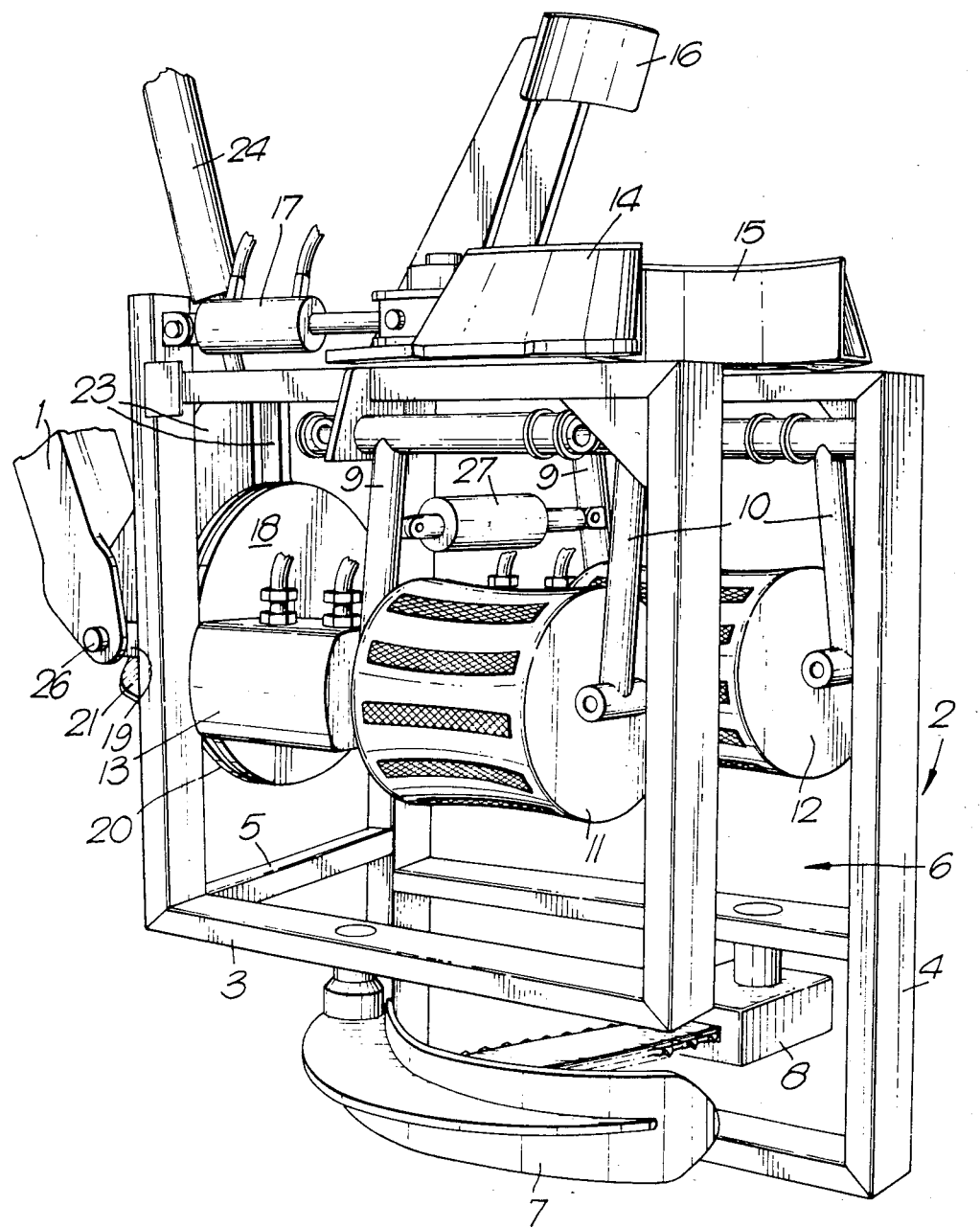
Figure 3:
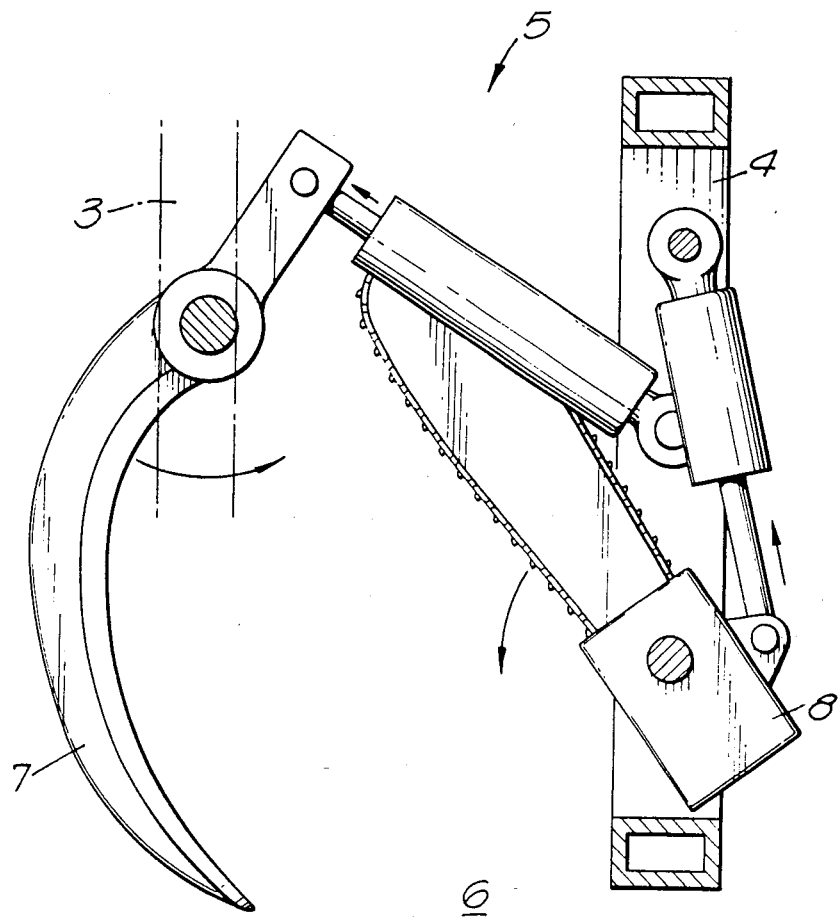
Figure 4:
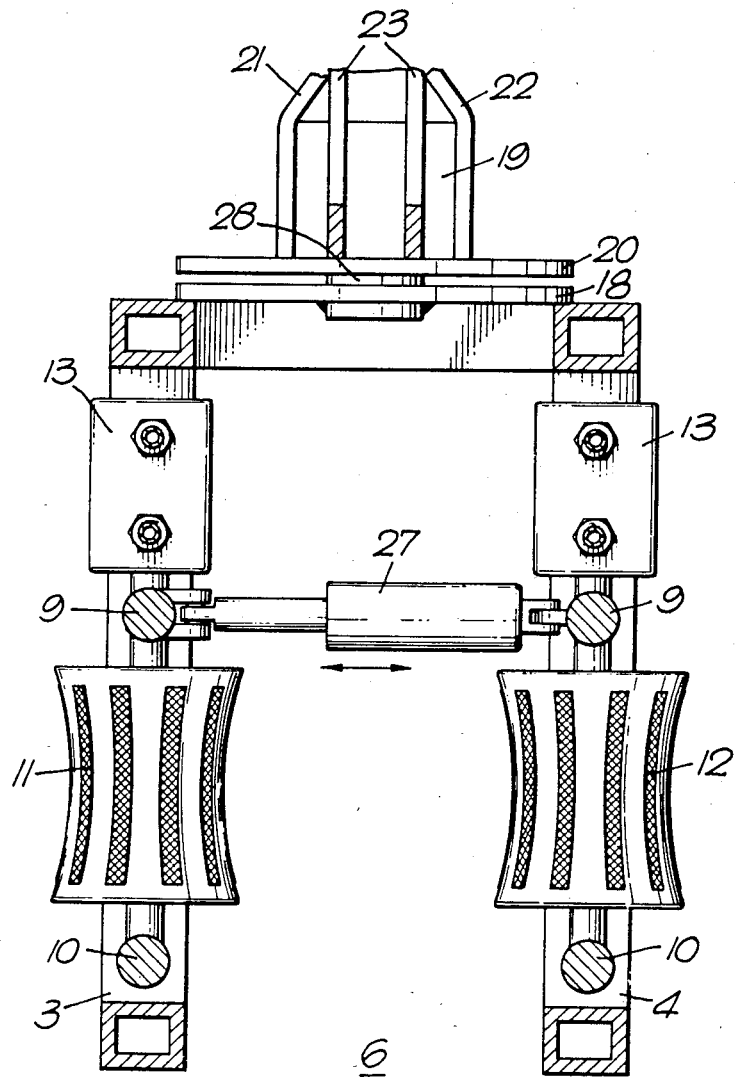
Figure 5:
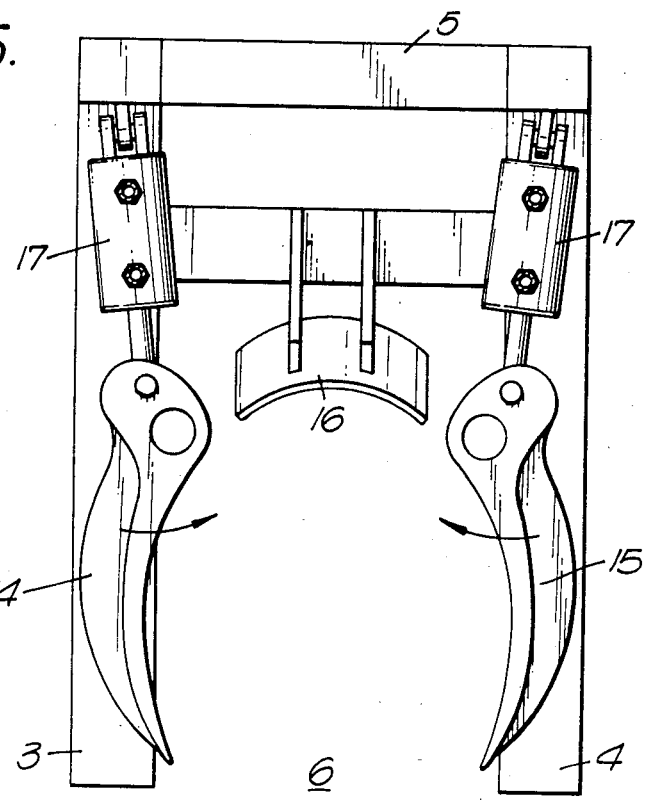
Figure 6:
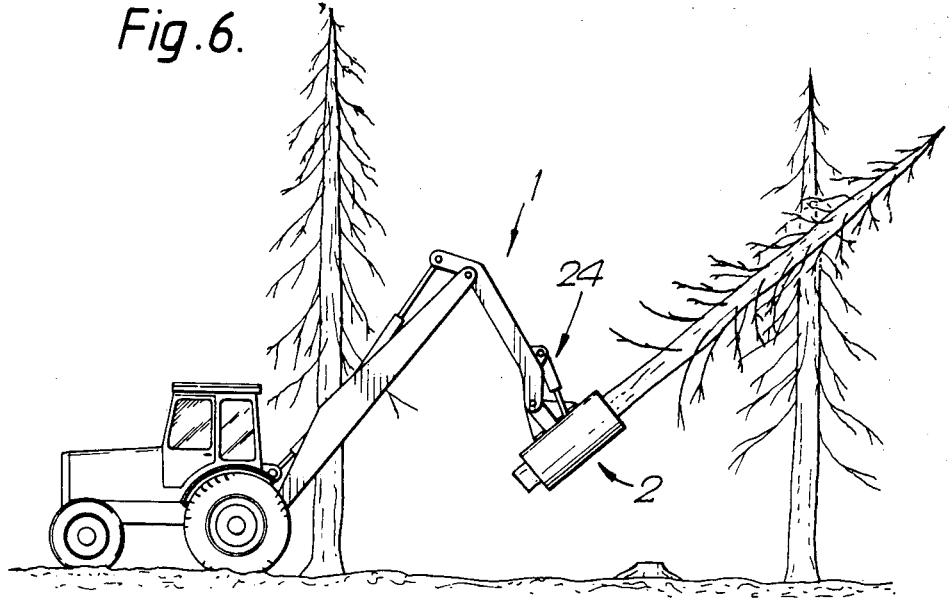

The harvesting device in accordance with the invention is more closely described in the following description with references to the closed drawings in which FIGS. 1 and 2 are perspective views of the harvesting device, FIGS. 3–5 are plan views showing the construction in detail in corresponding sections from FIG. 1 and FIG. 6 shows schematically the combination of tractor, jib and device in work.

The harvesting device 2 is connected to a mobile vehicle such as tractor by means of crane jib or boom 1. The jib 1 is tiltable and pivotable by means of one or several links so that the distance between the vehicle and the device can be adjusted during harvesting. Further the jib can be turnable around the vertical axle, which connects the jib to the vehicle. These constructions can vary within a large scale and are familiar to a person skilled to art and thus they aren't described more closely in this connection.

FIGS. 1 and 2 show the harvesting device 2, which consists of cutting, felling and debranching means, which can be operated by hydraulic equipment such as cylinders and motors connected to them. The hydraulic tubes and valves are not shown in the figures in order to clearify the construction itself. The operator of the harvesting device has the control units in hand for operating the valves to accomplish the cutting, felling and debranching stages.

The device 2 is a general U-shaped frame (in a horizontal section) comprising frame parts 3, 4 and 5. The frame is made of welded beams. These beams are arranged so that the side parts 3, 4 of the frame have mainly rectangular form. The side parts 3, 4 of the frame form the sides of the U-shaped configuration and the rear part 5 of the frame forms the bottom part of the same, whereas the front side 6 is open for bringing the tree into the U-shaped frame for harvesting. The attachment of the device 2 to the jib 1 is at the rear part 5 of the frame. The cutting means 7, 8 are attached to the lower beams of these side parts in the lower section of the same, the conveying means 11, 12 are attached to the upper beam and placed in the openings of these side parts in the middle section of the same and debranching means 14, 15 are attached to the upper beams of these side parts in the upper section of the same.

In the embodiment shown in FIGS. 1 and 2 and especially in FIG. 3 the holding jaw 7 is attached to the lower beam of the side part 3 of the frame. This jaw is turnable round its attachment axle by means of a hydraulic cylinder inside the U-shaped frame mainly in a plane perpendicular to the longitudinal direction of the tree. The jaw 7 holds the tree to be harvested inside the frame while the cutting organ 8 cut the tree. The cutting organ 8 is preferably a chain saw attached to the opposite side part 4 and is turnable round its attachment axle inside the U-shaped frame mainly in a plane perpendicular to the longitudinal direction of the tree by means of a hydraulic cylinder. The jaw 7 and the cutting organ 8 are placed at the lower side of the device 2, when it is in a cutting position as shown in figures. During cutting the parts 7 and 8 are effecting to the opposite directions and are placed on the top of another in the vertical direction to allow the cutting.

The side parts 3 and 4 of the frame comprise the conveying means 11 and 12 as shown in FIG. 4, which are used during the debranching and possible further cuts of the tree into smaller parts. The conveying means are in the middle section of the side parts 3 and 4 and are attached to the upper beams of the same by means of articulated arms 9 and 10. The conveying means itself can suitably comprise roller which is turnable around its attachment axle to the articulated arms. The surface of the roller is roughned in order to firmly contact to the surface of the tree to be conveyded through the device. The hydraulic motor 13 connected to the axle of the respective roller is driving the rollers. The arms 9 and 10 are turnable round their attachment axle inside the U-shaped frame by means of hydraulic cylinder 27 connecting the arms 9 of the opposite rollers so that the contact between the rollers and the tree is constant. The rollers are arranged to rotate in opposite directions so that they move the trunk of the tree towards the jaw 7 and cutting organ 8 and therethrough the device, whereat the cutting means cut the trunk into logs if necessary.

The upper side of the frame comprise debranching jaws 14, 15, 16 as especially shown in FIG. 5. The upper edges of these jaws are sharpened in order to accomplish the debranching when the rollers convey the trunk forwards. One of the jaws 16 is stationary, somewhat curved and arranged mainly parallel to the rear side 5 of the frame. The two other jaws 14 and 15 are connected to hydraulic cylinders 17 by means of which they are turnable round their attachment axles toward each other in a plane mainly perpendicular to the longitudinal direction of the tree so that they can due to their curved shape surround the trunk together with the stationary jaw 16.

The rear part 5 of the frame comprise support means 18 for example a steering plate which is in the plane of the rear part and attached to it. Another steering plate 20 is attached to the hydraulic motor 19, the axle 28 of which is attached to the plate 18. The steering plate 20 forms a part of the felling frame and is parallel with the above mentioned plate 18. The felling frame comprise flanges 20–23 radially projecting from the centre of the plate 20, where the motor 19 is placed. The head of the jib 1 is linked at 26 to the felling frame at the centre of the same and hydraulic cylinder 24 is linked at 25 to the flanges 23 vertically above the link 26. The opposite end of the cylinder 24 is linked to the jib. Thus by means of the cylinder 24 the harvesting device can be turned in a vertical plane round the link 26.

By means of the hydraulic motor 19 it is possible to rotate the device 2 in a transversal plane. The axle 28 of the motor connects and supports the felling frame 20–23 and the device 2.

With reference to the foregoing the construction of the felling frame and its connection to the device 2 make several felling directions of the trunk possible. Firstly after cutting the distance between the vehicle and the device 2 can be adjusted by means of the tiltable jib 1, but second and most important factor is the possibility of rotating the device 2 with the trunk both in a vertical plane in the longitudinal direction of the jib 1 by means of the cylinder 24 and in the transverse direction with respect to the said plane by means of the motor 19. These possibilities and their combinations make it possible for the operator to direct the felling of the trunk for debranching and possible further cuts to the most advantageous direction. These properties can be also used advantageously when grasping the next tree for cutting.

The cutting, felling and debranching can be carried out so that the vehicle with the harvesting devide 2 moves in the forest to be cleaned gradually. This can be carried out without damaging the remaining trees and their roots due to the fact that the total weight and thus the surface pressure of the combination and other dimensions are suitable. The harvesting device 2 mainly due to its frame construction is light enough to allow the use of light-weight tractor as the mobile vehicle. The combination is easy to manouver between the remaining trees.

By means of the jib 1 the harvesting device 2 is directed towards the tree and further adjustment can be made by cylinder 24 and motor 19 if necessary so that the device 2 is in a position shown in FIGS. 1 and 2. The tree is directed inside the U-shaped frame between the side parts 3 and 4, which is of course free for the tree. After this the jaw 7 rotates to grasp the tree and to hold it inside the frame when the cutting organ 8 cut the tree. Thereafter, by using parts 19 and 24 the trunk is felled to the direction most suitable for debranching which is done by the jaws 14, 15, 16, which surround the trunk, two of them 14, 15 being adjustable by means of cylinders 17 to maintain the contact of the same with the surface of the trunk and thus remove the branches. The trunk is conveyed towards the jaw 7 and cutting organ 8, which are rotated away from their cutting positions by means of the rollers 11, 12 at the opposite sides of the trunk. The rollers driven by motors 13 are pressed against the tree by the cylinder 27 connecting the articulated arms 9. Further cuts may be done by means of the jaw 7 and cutting organ 8 in order to divide the trunk into smaller logs.

I claim:

1. Tree harvesting device, which is connectable to a mobile vehicle by means of a jib and has means for cutting, felling and debranching a tree, said device comprising a general U-shaped frame having two side parts, a rear part and an open front side; cutting means, conveying means and debranching means attached to said side parts; a felling frame attached to said rear part by means of a turnable means in order to turn the device in a transversal plane with respect to a vertical plane in the longitudinal direction of the jib; and means for connecting said felling frame to the jib so that said device is turnable in said vertical plane in the longitudinal direction of the jib.

2. Tree harvesting device as defined in claim 1, in which the cutting means comprises a holding jaw and a chain saw located on a lower section of the side parts and arranged to turn inside the U-shaped frame from opposite directions and in different horizontal planes in order to cut a tree inside the U-shaped frame.

3. Tree harvesting device as defined in claim 1, in which the conveying means comprises at least one pair of opposing rollers each driven by a motor and located adjacent to a middle section of a corresponding one of the side parts, each roller being connected to the corresponding side part by means of turnable arms, the arms of the opposite rollers being connected to each other by means for changing the distance between the rollers in order to turn the rollers inside the U-shaped frame to contact the surface of a tree inside the U-shaped frame and to convey the tree in its longitudinal direction by means of the rollers.

4. Tree harvesting device as defined in claim 1, in which the debranching means comprises a pair of movable jaws located adjacent to an upper section of the side parts and turnable inside the U-shaped frame from opposite directions and in different horizontal planes in order to contact the surface of a tree inside the U-shaped frame.

5. Tree harvesting device as defined in the claim 4, in which a stationary jaw is arranged between said movable jaws.

6. Tree harvesting device as defined in the claim 1, in which the rear part includes a support means, and in which the turnable means comprises a motor having an axle attached to said support means, said motor being attached to the felling frame.

7. Tree harvesting device as defined in the claim 1, in which the felling frame comprises a lower link to which the head of the jib is attached and an upper link to which a cylinder is attached, the opposite end of the cylinder being attached to the jib.

* * * * *